(No Model.)
W. H. PAIGE.
NUT LOCK.
No. 254,685. Patented Mar. 7, 1882.
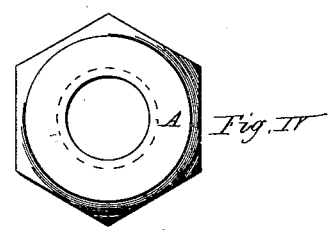
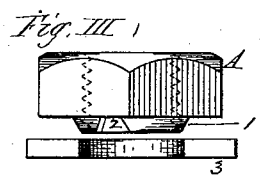
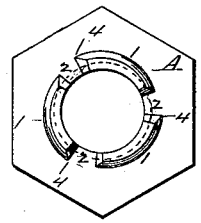
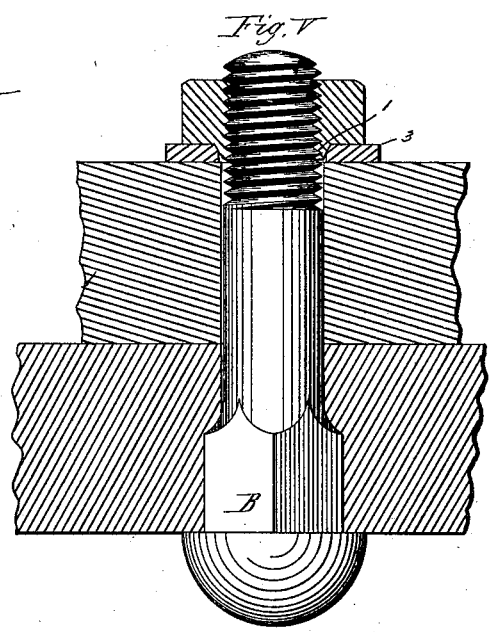
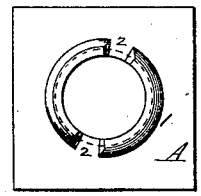
Witnesses.
E. E. Holton.
Chas. H. Wood.
Inventor,
William H. Paige
By T. A. Curtis
his atty.

UNITED STATES PATENT OFFICE.

WILLIAM H. PAIGE, OF SPRINGFIELD, MASSACHUSETTS.

NUT-LOCK.

SPECIFICATION forming part of Letters Patent No. 254,685, dated March 7, 1882.

Application filed November 14, 1881. (No model.)

*To all whom it may concern:*

Be it known that I, WILLIAM H. PAIGE, of Springfield, in the county of Hampden and State of Massachusetts, have invented a new and useful Improvement in Lock-Nuts, of which the following is a specification and description.

The object of my invention is to provide a lock-nut, which is cheap and which is effective in its operation, which may be forged up complete by means of dies, and will be ready for market, and will require no further operation by machinery after leaving the forging-dies, except tapping for the bolt; and I accomplish this by the means substantially as hereinafter described, and illustrated in the accompanying drawings, in which—

Figure I is a plan view of a nut with my invention made thereon. Fig. II is a modification of the same. Fig. III is a side view of the same, with a central vertical or transverse section of a washer to be used in connection with the nut. Fig. IV is a plan view of the outer face of the nut as it appears when turned into place on a bolt; and Fig. V is a section through pieces of wood at the axis of a bolt, showing the nut turned up to a bearing against a washer upon the bolt.

In the drawings, A represents a nut, which may have any desired number of sides, and having upon one of its faces, just outside the hole containing the thread, a conical-shaped fillet, as 1, of general circular form in plan, whose inner diameter from inside to inside is the same as the diameter of the hole through the nut, and is on the same plane, and whose exterior on the side is beveled or inclined, as shown clearly in Fig. III, or is substantially of that form.

Any desired number of openings, as 2, are made through this fillet transversely, said openings extending from the top of the fillet down or inward to the face of the nut, the bottom of the opening being upon the same plane with the face of the nut upon which the fillet is made, as shown clearly in Figs. I, II, and III, and the ends of the fillet at the openings, as 2, are preferably beveled or inclined in the direction of the fillet, as shown in the drawings, the openings being wider at the apex of the fillet than at its base, this form of opening being favorable to the die with which the opening is forged, as it will retain its shape, whereas a die to forge a narrow opening with vertical sides would not hold its form, as the small projection would soon become heated and be beaten out of shape.

In order that the fillet may make for itself a seat in the washer or other article into which it is turned, I prefer in some cases to make the ends of the fillet at one side of each opening, as 2, a little thicker than the adjacent end of the fillet on the opposite side of the same opening, as shown clearly in Fig. II, so that the outer sharp corner at the thicker end of the fillet shall project a little farther from the center of the hole in the nut than any other point in the fillet. By this construction, when the nut is turned onto a bolt and up to a bearing, as the fillet enters the washer, as shown in Fig. III, or the hole in the piece against which it is to be turned, the sharp projecting corners of the fillet at 4 will cut away the sharp corner of the washer at the hole and form a countersink or seat for the fillet, and as the nut is turned up firmly with more or less force, each section of the fillet, as 1, will be forced inward against the bolt, and that portion of the thread in the nut which is on the inside of the fillet will be made to gripe the thread of the bolt with great force, and when made in this manner the fillet will always form for itself a seat, particularly as in hot-pressed nuts the effect of the forging is to give to the surface of the nut a certain amount of chill or hardness, and as the openings, as 2, are forged, the sharp projecting corners are well adapted to countersink the hole to a certain extent.

This invention being made upon or applied to the inner face of the nut, and the latter being no thicker than any ordinary nut, it is evident that it is particularly applicable to hexagon nuts having an outer finished face for use upon finished work, and when turned on in place no evidence of any locking mechanism would appear. When turned onto a bearing the fillet will be forced in against the bolt to a degree quite sufficient to prevent the nut from being forced off by any jar, and yet the thread of the bolt, and of the nut also, will remain uninjured, which is not the case with many of the lock-nuts now in use.

It will not be necessary to use the washer, as 3, in connection with the nut, except when the nut is to be used in wood-work, as shown in Fig. V.

Having thus described my invention, what I claim as new is—

1. The nut A, comprehending the narrow flange or fillet 1, made on one of its faces and provided with transverse openings, as 2, the interior of said flange or fillet being made on the same plane as the bore of the nut and its exterior made smooth and inclined or beveled with reference to its interior, substantially as and for the purpose described.

2. In an improved lock-nut, a sectional fillet made on one of its faces, with openings, as 2, between the sections, with the inner side of the sections on the same plane with the bore of the nut, and the exterior side of each section inclined to the interior side, and with one end of each section made thicker than the adjacent end of the next section, substantially as described.

WILLIAM H. PAIGE.

Witnesses:
T. A. CURTIS,
CHAS. H. WOOD.